(12) United States Patent
Beskrovny et al.

(10) Patent No.: US 9,830,253 B2
(45) Date of Patent: Nov. 28, 2017

(54) ELIMINATING REDUNDANT INTERACTIONS WHEN TESTING COMPUTER SOFTWARE APPLICATIONS

(71) Applicant: International Business Machines Corporation, Armonk, NY (US)

(72) Inventors: Evgeny Beskrovny, Ramat Gan (IL); Omer Tripp, Bronx, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 576 days.

(21) Appl. No.: 14/039,930

(22) Filed: Sep. 27, 2013

(65) Prior Publication Data
US 2015/0095891 A1    Apr. 2, 2015

(51) Int. Cl.
G06F 9/44      (2006.01)
G06F 11/36     (2006.01)

(52) U.S. Cl.
CPC .............. *G06F 11/3672* (2013.01)

(58) Field of Classification Search
None
See application file for complete search history.

(56) References Cited

U.S. PATENT DOCUMENTS

| | | | |
|---|---|---|---|
| 2006/0117055 A1 | 6/2006 | Doyle | |
| 2008/0148039 A1* | 6/2008 | Cobb | G06F 11/3624 713/100 |
| 2010/0287534 A1* | 11/2010 | Vangala | G06F 11/3612 717/124 |
| 2011/0289488 A1 | 11/2011 | Ghosh | |
| 2012/0054552 A1 | 3/2012 | Artzi et al. | |
| 2012/0266137 A1 | 10/2012 | Alexander et al. | |
| 2014/0053134 A1* | 2/2014 | Wiggers | G06F 11/3608 717/124 |

FOREIGN PATENT DOCUMENTS

| | | |
|---|---|---|
| EP | 1680741 B1 | 9/2012 |
| JP | 2011248887 A | 12/2011 |

OTHER PUBLICATIONS

Wikipedia, Black-box testing, http://en.wikipedia.org/wiki/Block-box_testing, Internet Archive Feb. 13, 2010.*

(Continued)

*Primary Examiner* — Brian W Wathen
*Assistant Examiner* — Timothy Duncan
(74) *Attorney, Agent, or Firm* — Cuenot, Forsythe & Kim, LLC

(57) ABSTRACT

Testing computer software applications includes comparing multiple execution paths associated with multiple interactions performed with a computer software application during execution of the computer software application in order to determine which of the execution paths are similar in accordance with a predefined similarity criterion, identifying a subset of the interactions whose associated execution paths are similar in accordance with the predefined similarity criterion, and performing fewer than all of the interactions in the subset with the computer software application during execution of the computer software application.

20 Claims, 3 Drawing Sheets

(56) References Cited

OTHER PUBLICATIONS

Yoo, S. et al., "Regression Testing Minimisation, Selection and Prioritisation: a Survey," Software Testing, Verification and Reliability, vol. 22, No. 2, pp. 67-120, Mar. 2012.

Selvakumar, S. et al., "Regression test suite minimization using dynamic interaction patterns with improved FDE", European Journal of Scientific Research, ISSN 1450-216X, vol. 49, No. 3, pp. 332-353, 2011.

IBM, "System, method and apparatus for on-the-fly redundancy detection and elimination during dynamic testing using a glass-box methodology", IP.com Prior Art Database Technical Disclosure i00208354, Jul. 4, 2011.

\* cited by examiner

ELIMINATING REDUNDANT INTERACTIONS WHEN TESTING COMPUTER SOFTWARE APPLICATIONS

FIELD OF THE INVENTION

This disclosure relates to computer software testing in general.

BACKGROUND OF THE INVENTION

Dynamic analysis tools are often used by computer software developers to test computer software applications, typically by first exploring a computer software application to discover its interfaces, including those by which data may be provided to the application, and then by interacting with the application's interfaces and monitoring the application's responses to such interactions. In one type of dynamic analysis a computer software application is tested for security vulnerabilities by providing test data with known malicious properties to the application, and then observing the behavior of the application. For example, dynamic analysis may be used to test a web application that is accessed over a computer network, such as the Internet, by employing a "black-box tester" running on one computer that sends HTTP requests via a computer network to the web application that is hosted by another computer. The HTTP requests are configured with malicious test data payloads drawn from a library of test data payloads designed to test for security vulnerabilities such as SQL injection, cross-site scripting, and command injection.

A black-box tester could send all possible test data payloads to a computer software application to test for all possible security vulnerabilities. However, as the cost of sending many HTTP requests via a computer network is high in terms of time and bandwidth, commercial black-box testers that test web applications via computer networks typically send only a few dozen test payloads per HTTP parameter being tested in order to keep such costs down. Unfortunately, this often means that some security vulnerabilities go undetected.

SUMMARY OF THE INVENTION

In one aspect of the invention a method is provided for testing computer software applications, the method including comparing a plurality of execution paths associated with a plurality of interactions performed with a computer software application during execution of the computer software application, thereby determining which of the execution paths are similar in accordance with a predefined similarity criterion, identifying a subset of the interactions whose associated execution paths are similar in accordance with the predefined similarity criterion, and performing fewer than all of the interactions in the subset with the computer software application during execution of the computer software application.

In other aspects of the invention systems and computer program products embodying the invention are provided.

BRIEF DESCRIPTION OF THE DRAWINGS

Embodiments of the invention will be understood and appreciated more fully from the following detailed description taken in conjunction with the appended drawings in which.

DETAILED DESCRIPTION OF THE INVENTION

Figure 1:
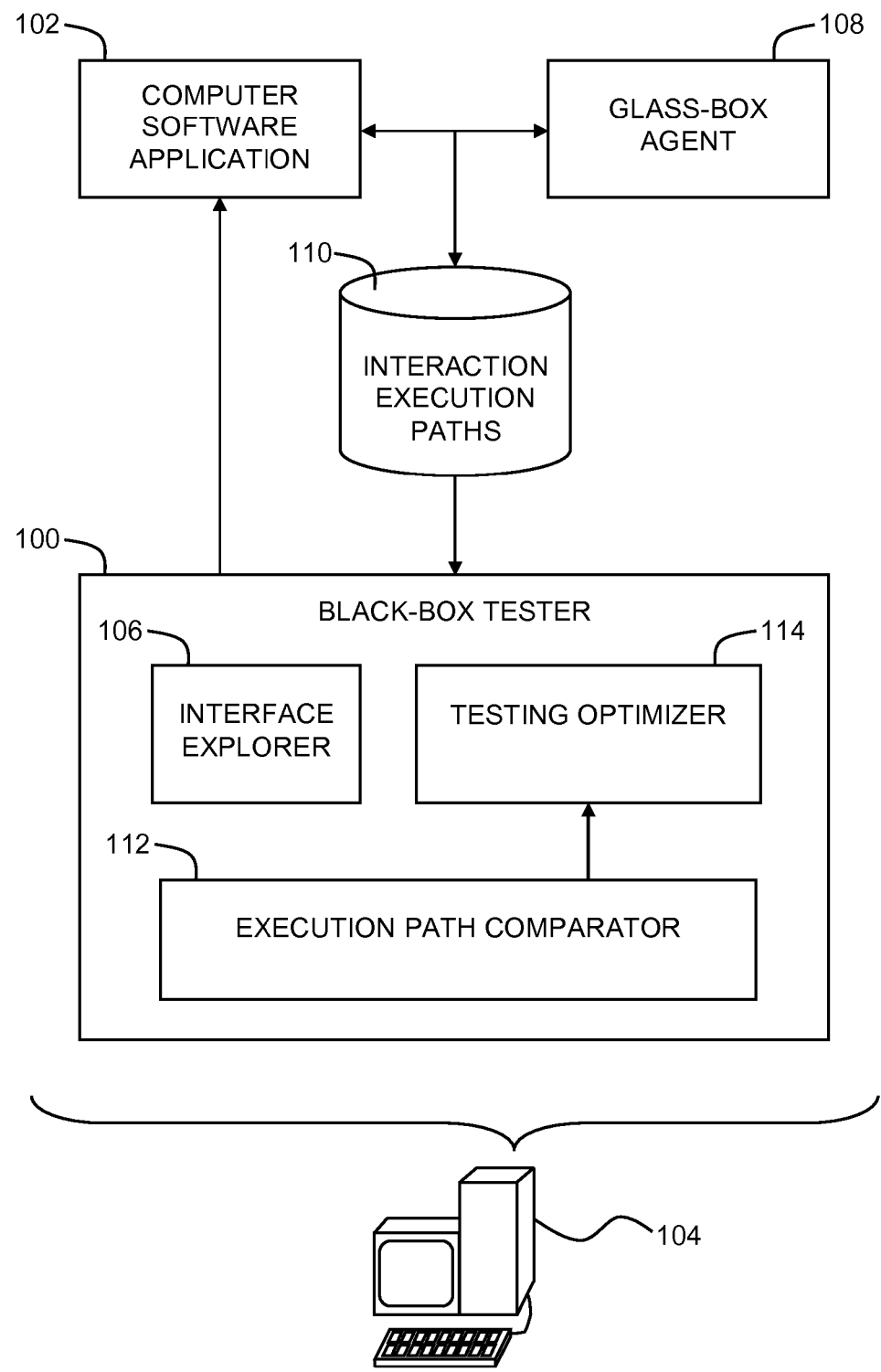
FIG. 1 is a simplified conceptual illustration of a system for testing a computer software application, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1 which is a simplified conceptual illustration of a system for testing a computer software application, constructed and operative in accordance with an embodiment of the invention. In the system of FIG. 1, a black-box tester 100, such as IBM Security AppScan™, commercially-available from International Business Machines Corporation, Armonk, N.Y., is configured to interact with a computer software application 102 during its execution by a computer, such as a computer 104, in accordance with conventional black-box testing techniques except as is otherwise described herein. Computer software application 102 may be any type of computer software application that is suitable for testing using conventional black-box testing techniques, including computer software applications configured for use with mainframe and desktop computers and mobile computing devices, as well as "web" applications including Hypertext Markup Language (HTML)-encoded web pages that may be hosted by a computer server and accessed by one or more client computers via a computer network, such as the Internet.

Black-box tester 100 preferably includes an interface explorer 106 configured to interact with computer software application 102 in accordance with conventional techniques in order to discover interfaces exposed by computer software application 102. Computer software application 102 is preferably instrumented, such as by a glass-box agent 108, to detect such interactions, as well as to identify the execution paths taken within computer software application 102 in response to such interactions, where an execution path is defined as a sequence of locations of executed instrumentation instructions within computer software application 102. Glass-box agent 108 preferably instruments a predefined percentage, such as 5-10%, of the control structures within what is identified, such as by a human operator, as the business logic of computer software application 102, although any and all portions of the instructions of computer software application 102 may be instrumented.

Computer software application 102 is preferably configured to report to glass-box agent 108 regarding the detected interactions and their associated execution paths, which information glass-box agent 108 makes available to black-box tester 100, such as in a data store of interaction execution paths 110. Alternatively, computer software application 102 makes the detected interactions and their associated execution paths available to black-box tester 100, such as in data store of interaction execution paths 110.

Black-box tester 100 preferably includes an execution path comparator 112 configured to compare the interaction execution paths identified above in order to determine which of the execution paths are similar in accordance with one or more predefined similarity criteria. For example, the similarity criteria may be met for two or more execution paths if the sequence of locations of executed instrumentation instructions in the execution paths is identical, or alternatively if their sequences are similar to a predefined degree of similarity using any known similarity measurement technique. Sequence alignment techniques used in bioinformatics may be used to align multiple execution paths, where a penalty function maps the unaligned locations within the execution paths to a number that can be compared against a configurable threshold value that is used to decide whether there is similarity between the execution paths. The similarity criteria may optionally give different weight to different parts of the execution paths. For example, multiple interactions with computer software application 102 may have different entry points into computer software application 102 where the first 20% of the locations in their execution paths relate to input parsing, whereas the last 80% of the locations in their execution paths relate to business logic that is applied to the various inputs. In this case the importance of the first 20% of execution path information may be discounted relative to the last 80% of execution path information, or the first 20% may be ignored altogether.

Black-box tester 100 also preferably includes a testing optimizer 114 configured to identify one or more subsets of the interactions identified above whose associated execution paths are determined by execution path comparator 112 to be similar, and test computer software application 102 by performing fewer than all, and preferably only one, of the interactions in any given subset with computer software application 102 during execution of computer software application 102. In this manner testing optimizer 114 is configured to interact with computer software application 102 with the express purpose of minimizing such interactions, since instead of performing with computer software application 102 all interactions detected by the instrumentation of computer software application 102, testing optimizer 114 effectively excludes one or more, and preferably all but one, of the interactions from the subset as being redundant on the basis of having similar execution paths within computer software application 102.

Any of the elements shown in FIG. 1 are preferably implemented, in accordance with conventional techniques, in computer hardware and/or in computer software embodied in a non-transitory, computer-readable medium.

Figure 2:
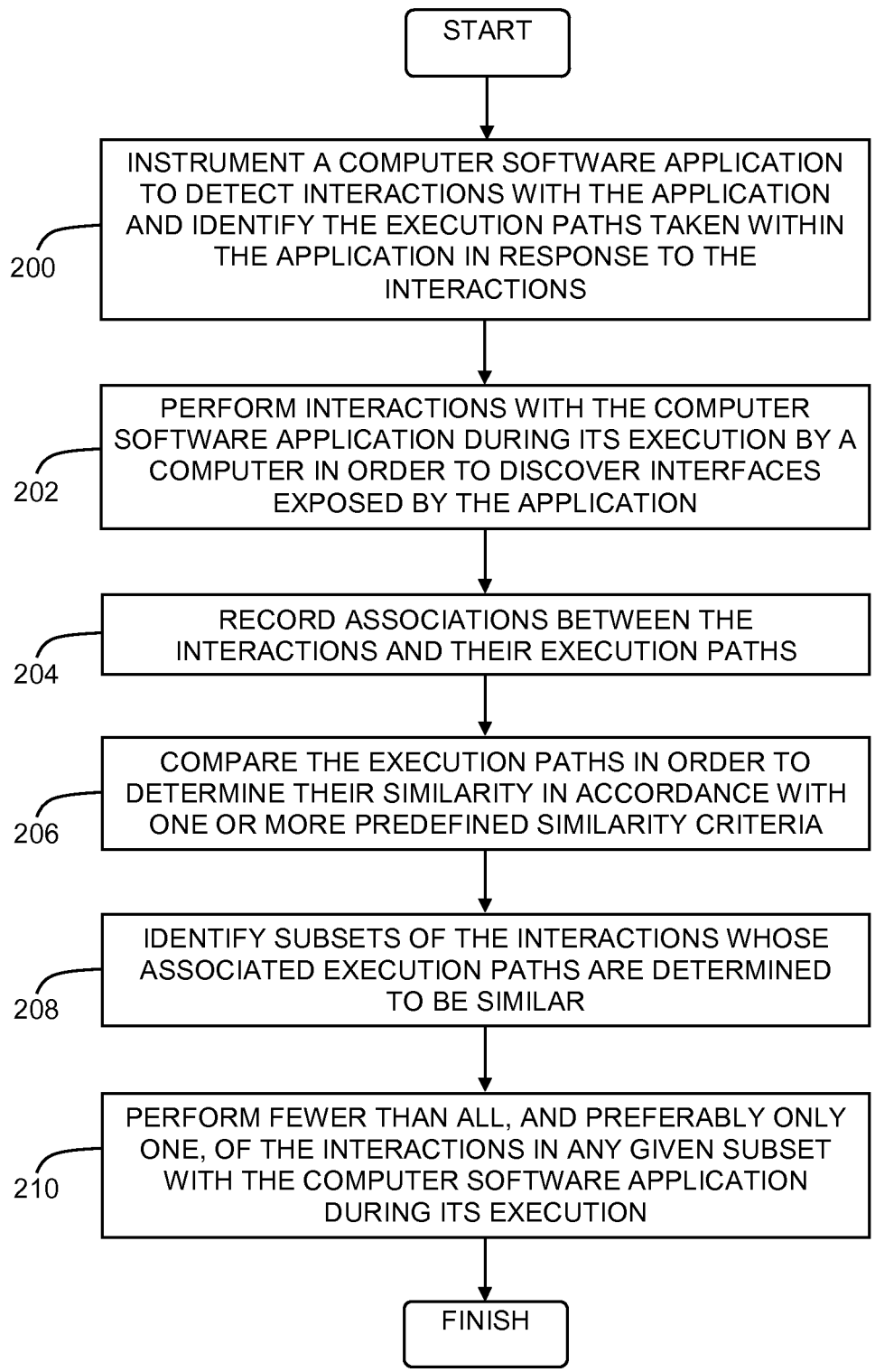
FIG. 2 is a simplified flowchart illustration of an exemplary method of operation of the system of FIG. 1, operative in accordance with an embodiment of the invention.

Reference is now made to FIG. 2, which is a simplified flowchart illustration of an exemplary method of operation of the system of FIG. 1, operative in accordance with an embodiment of the invention. In the method of FIG. 2 a computer software application is instrumented to detect interactions with the application and identify the execution paths taken within the application in response to the interactions (step 200). Interactions are performed with the computer software application during its execution by a computer in order to discover interfaces exposed by the application (step 202) and the associations between the interactions and their execution paths are recorded (step 204). The execution paths are compared in order to determine their similarity in accordance with one or more predefined similarity criteria (step 206). One or more subsets of the interactions are identified whose associated execution paths are determined to be similar (step 208). Fewer than all, and preferably only one, of the interactions in any given subset are performed with computer software application during its execution (step 210).

The system of FIG. 1 and method of FIG. 2 may be illustrated in the context of the following example in which a social website includes the following two servlets that have been instrumented as describes above:

```
PostShortUpdateServlet( ) {
....
InstrumentationHook(CurrentLocation)
....
InstrumentationHook(CurrentLocation)
....
InstrumentationHook(CurrentLocation)
....
DBUtilAPI( )
....
Render( )
....
}
PostFullArticleServlet( ) {
....
InstrumentationHook(CurrentLocation)
....
InstrumentationHook(CurrentLocation)
....
InstrumentationHook(CurrentLocation)
....
DBUtilAPI( )
....
Render( )
....
}
``` where PostShortUpdateServlet( ) processes short user postings to the website, whereas PostFullArticleServlet( ) processes longer and richer user postings to the website. In this example both servlets call the same DBUtil API for storing the posted data into a database, and share the same Render( ) method for rendering the response back to the user, and more weight is given, and/or more instrumentation hooks are used, with respect to the downstream database and rendering processing than with respect to the PostShortUpdateServlet( ) and PostFullArticleServlet( ) entry points when determining execution path similarity. Therefore, executing different requests leading to processing by these two entry points would result in similar execution paths, and thus requests leading to one of the servlets may be eliminated during testing since the functionality of interest exercised by both execution paths largely overlaps.

Figure 3:
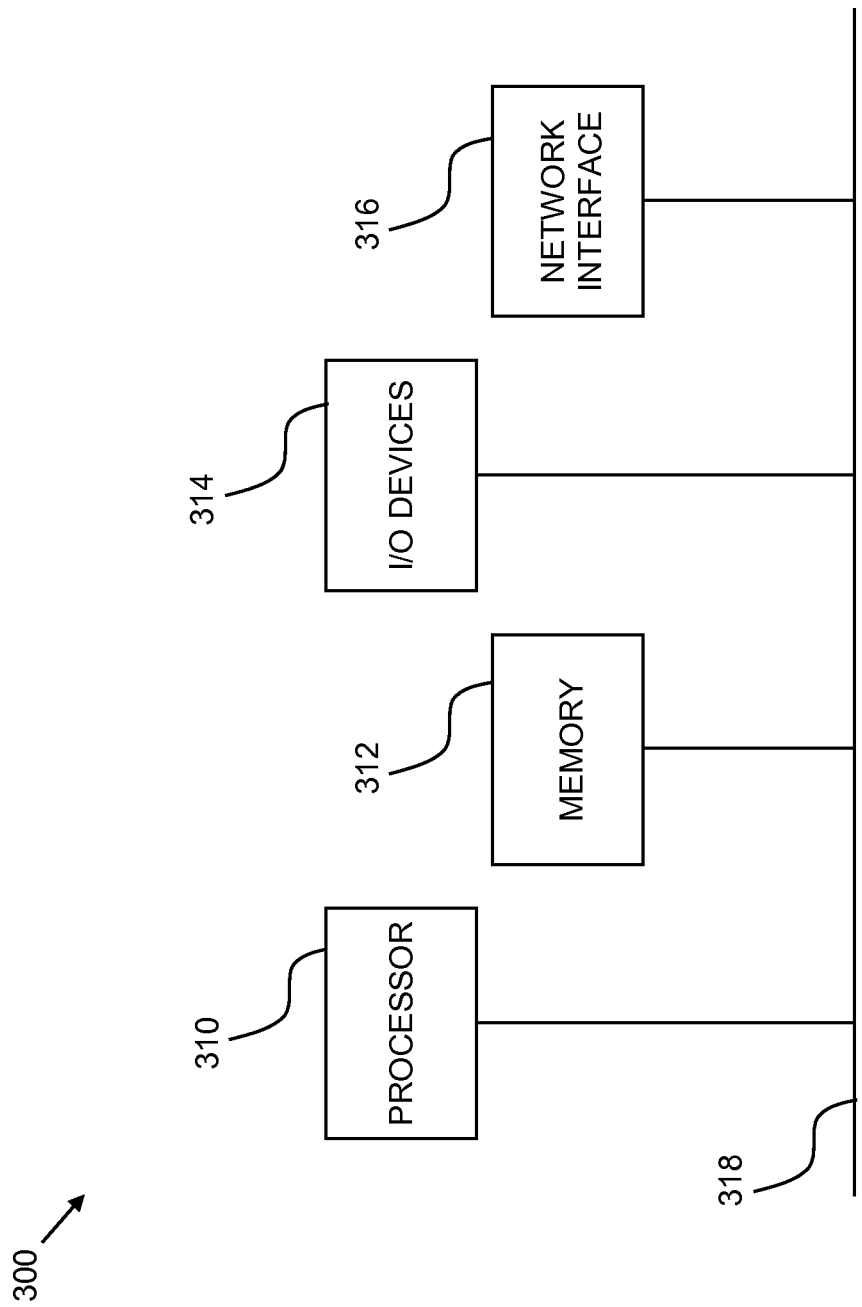
FIG. 3 is a simplified block diagram illustration of an exemplary hardware implementation of a computing system, constructed and operative in accordance with an embodiment of the invention.

Referring now to FIG. 3, block diagram 300 illustrates an exemplary hardware implementation of a computing system in accordance with which one or more components/methodologies of the invention (e.g., components/methodologies described in the context of FIGS. 1-2) may be implemented, according to an embodiment of the invention.

As shown, the techniques for controlling access to at least one resource may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer.

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for testing a computer software application, comprising:
   identifying, from a plurality of execution paths, first and second execution paths that meet a predefined similarity criterion;
   identifying, from the first and second execution paths, a subset of instrumentation instructions within the first and second execution paths based upon the predefined similarity criterion; and
   testing the computer software application by performing fewer than all instrumentation instructions within the subset, wherein
   each of the plurality of execution paths define a plurality of instrumentation instructions performed with the computer software application during execution of the computer software application.

2. The method of claim 1, wherein
   the testing performs only one of the instrumentation instructions within the subset.

3. The method of claim 1, wherein
   the testing minimizes a number of the instrumentation instructions within the subset being performed.

4. The method of claim 1, wherein
   the subset of instrumentation instructions involve business logic.

5. The method of claim 1, wherein
   the subset of instrumentation instructions does not include input parsing.

6. The method of claim 1, wherein
   a plurality of subsets of instrumentation instructions are identified for the first and second execution paths.

7. The method of claim 6, wherein
   the testing is performed for each of the plurality of subsets.

8. A computer hardware system configured to test a computer software applications, comprising:
   a hardware processor programmed to initiate the following executable operations:
      identifying, from a plurality of execution paths, first and second execution paths that meet a predefined similarity criterion;
      identifying, from the first and second execution paths, a subset of instrumentation instructions within the first and second execution paths based upon the predefined similarity criterion; and
      testing the computer software application by performing fewer than all instrumentation instructions within the subset, wherein
   each of the plurality of execution paths define a plurality of instrumentation instructions performed with the computer software application during execution of the computer software application.

9. The system of claim 8, wherein
   the testing performs only one of the instrumentation instructions within the subset.

10. The system of claim 8, wherein
    the testing minimizes a number of the instrumentation instructions within the subset being performed.

11. The system of claim 8, wherein
    the subset of instrumentation instructions involve business logic.

12. The system of claim 8, wherein
    the subset of instrumentation instructions does not include input parsing.

13. The system of claim 8, wherein
    a plurality of subsets of instrumentation instructions are identified for the first and second execution paths.

14. The system of claim 13, wherein
    the testing is performed for each of the plurality of subsets.

15. A computer program product, comprising
    a hardware storage device having stored therein computer-readable program code for testing a computer software application,
    the computer-readable program code, which when executed by a computer hardware system, causes the computer hardware system to perform:
       identifying, from a plurality of execution paths, first and second execution paths that meet a predefined similarity criterion;
       identifying, from the first and second execution paths, a subset of instrumentation instructions within the first and second execution paths based upon the predefined similarity criterion; and
       testing the computer software application by performing fewer than all instrumentation instructions within the subset, wherein
    each of the plurality of execution paths define a plurality of instrumentation instructions performed with the computer software application during execution of the computer software application.

16. The computer program product of claim 15, wherein
    the testing performs only one of the instrumentation instructions within the subset.

17. The computer program product of claim 15, wherein
    the testing minimizes a number of the instrumentation instructions within the subset being performed.

18. The computer program product of claim 15, wherein
    the subset of instrumentation instructions involve business logic.

19. The computer program product of claim 15, wherein
    a plurality of subsets of instrumentation instructions are identified for the first and second execution paths.

20. The computer program product of claim 19, wherein
    the testing is performed for each of the plurality of subsets.

* * * * *